United States Patent [19]

Ishikawa

[11] Patent Number: 5,193,169

[45] Date of Patent: Mar. 9, 1993

[54] IMAGE DATA PROCESSING APPARATUS

[75] Inventor: Yuji Ishikawa, Yokohama, Japan

[73] Assignee: Canon Kabushiki Kaisha, Tokyo, Japan

[21] Appl. No.: 342,910

[22] Filed: Apr. 25, 1989

[30] Foreign Application Priority Data

Apr. 28, 1988 [JP] Japan ................. 63-108804

[51] Int. Cl.⁵ ............................................ G06F 13/28
[52] U.S. Cl. ........................... 395/425; 364/DIG. 1;
364/242.3; 364/242.31; 364/242.33; 364/238.4;
364/243; 364/DIG. 2; 364/920.7; 364/926.92
[58] Field of Search ... 364/200 MS File, 900 MS File;
395/425, 275

[56] References Cited

U.S. PATENT DOCUMENTS

| | | | |
|---|---|---|---|
| 4,658,350 | 4/1987 | Eggebrecht et al. | 395/425 |
| 4,782,439 | 11/1988 | Borkar et al. | 395/425 |
| 4,811,281 | 3/1989 | Okamoto et al. | 364/900 |
| 4,887,224 | 12/1989 | Okano et al. | 395/425 |
| 4,891,752 | 1/1990 | Fairman et al. | 395/425 |

Primary Examiner—Michael R. Fleming
Assistant Examiner—Debra A. Chun
Attorney, Agent, or Firm—Fitzpatrick, Cella, Harper & Scinto

[57] ABSTRACT

An image data processing apparatus has: a reading portion for reading an image of an original and outputting the image data thereon, an encoding portion for encoding the image data which has been output from the reading portion, an image memory for storing the encoded data which has been output from the encoding means, and a DMA control portion for DMA transferring the encoded data which has been output from the encoding portion to the image memory. The DMA control portion successively selects a plurality of DMA channels, and DMA transfers the encoded data using a selected DMA channel.

13 Claims, 6 Drawing Sheets

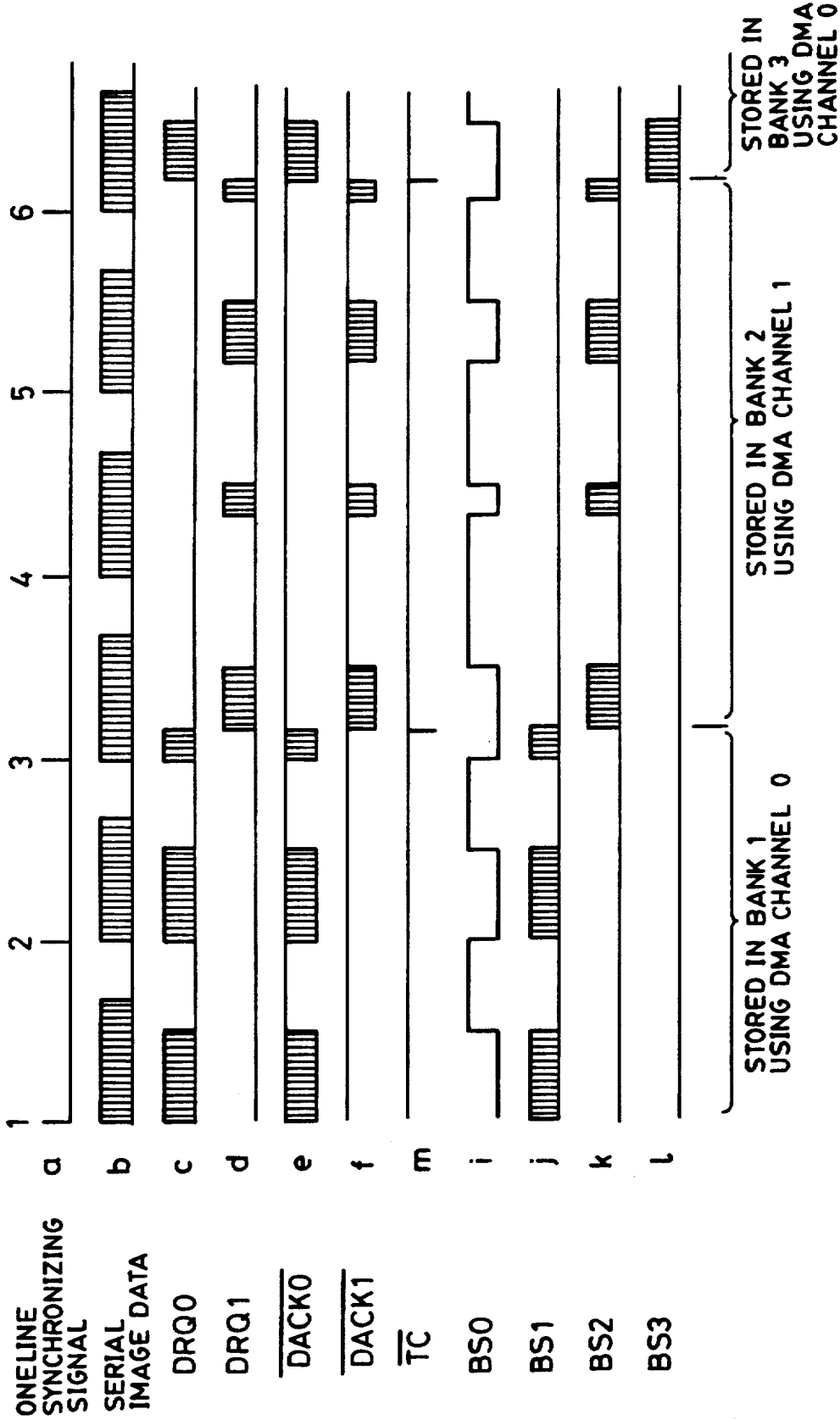

IMAGE DATA PROCESSING APPARATUS

BACKGROUND OF THE INVENTION

1. Field of the Invention

The present invention relates to an image data processing apparatus for processing image data in a facsimile and so on, by encoding image data read from a reading portion and by storing the resultant encoded data in a memory.

2. Description of the Related Art

FIG. 1 is a block diagram of a conventional reading device provided with an encoding circuit which is incorporated in a certain type of hardware, e.g., a facsimile. As is clear from the figure, a line memory 703 is interposed between a reading portion 701 such as a CCD and a coding portion 702 and is adapted to temporarily store data read by the reading portion.

In the above-described type of reading device, analog data is read out from the reading portion 701 for each picture element of the CCD that forms the reading portion in synchronism with a basic clock generated at a fixed timing. The reading device has the above-described configuration because, if binary data obtained by converting the analog data is directly input to the coding portion 702 which performs coding utilizing the well-known modified Huffman coding scheme (MH) or modified READ coding scheme (MR), the coding device must process data at an extremely high speed.

Further, even if such high-speed processing were to be realized, it would be very difficult to DMA transfer the coded data to an image memory 705 in a system through a system bus 704 of a general-purpose microcomputer 706 due to the time required for DMA transfer.

It has therefore been the practice to temporarily store at least the data which represents one line of an original in the line memory 703. The coding portion 702 processes encoding using the data stored in the line memory 703. In this way, even though the encoding process must be temporarily suspended to take account of the rate of DMA transfer, erasure of data which has been read can be avoided.

Thus, the conventional arrangement requires the line memory 703 to be interposed between the reading portion 701 and the coding portion 702, and this necessitates provision of an address generating circuit, a line memory selecting circuit and so on, which are used to control the line memory.

Further, since the code lengths of encoded data vary greatly since the length depends on the contents of the data read, the times required for encoding and the times required to DMA transfer the coded data differ accordingly. Thus, the drive needed for reading one line of the original assumes an intermittent form. In consequence, in order to increase the speed at which one line of the original is read, an expensive pulse motor driven by a self-started frequency must be used to feed the original.

Furthermore, since a large scale memory generally has a capacity on the order of several M bytes (millions of bytes), not all of it is disposed on the physical address space of the microcomputer, but it has a bank structure. In consequence, when data is DMA transferred over to the separate banks, the DMA operation must be suspended once in order to execute the program required to change the bank address.

Furthermore, the CPU cannot obtain access to other banks while the data is being DMA transferred to one of them.

SUMMARY OF THE INVENTION

In view of the aforementioned problems of the conventional data reading device, an object of the present invention is to provide an image data processing apparatus which is capable of continuously storing entered image data entered at high speed.

Another object of the present invention is to provide an image data processing apparatus which is capable of DMA transferring input image data without interruption.

Another object of the present invention is to provide an image data processing apparatus which is capable of effectively storing coded data obtained by coding image data read at high speed.

The above and other objects and effects of the present invention will become more apparent from the following description of the preferred embodiment thereof, taken in conjunction with the accompanying drawings.

BRIEF DESCRIPTION OF THE DRAWINGS

FIG. 7 is a timing chart of the operation of individual portions of the image processing apparatus of FIG. 3, which is conducted for each line of an original.

DETAILED DESCRIPTION OF THE PREFERRED EMBODIMENT

The present invention will now be described, by way of example, with reference to the preferred embodiment.

Figure 1:
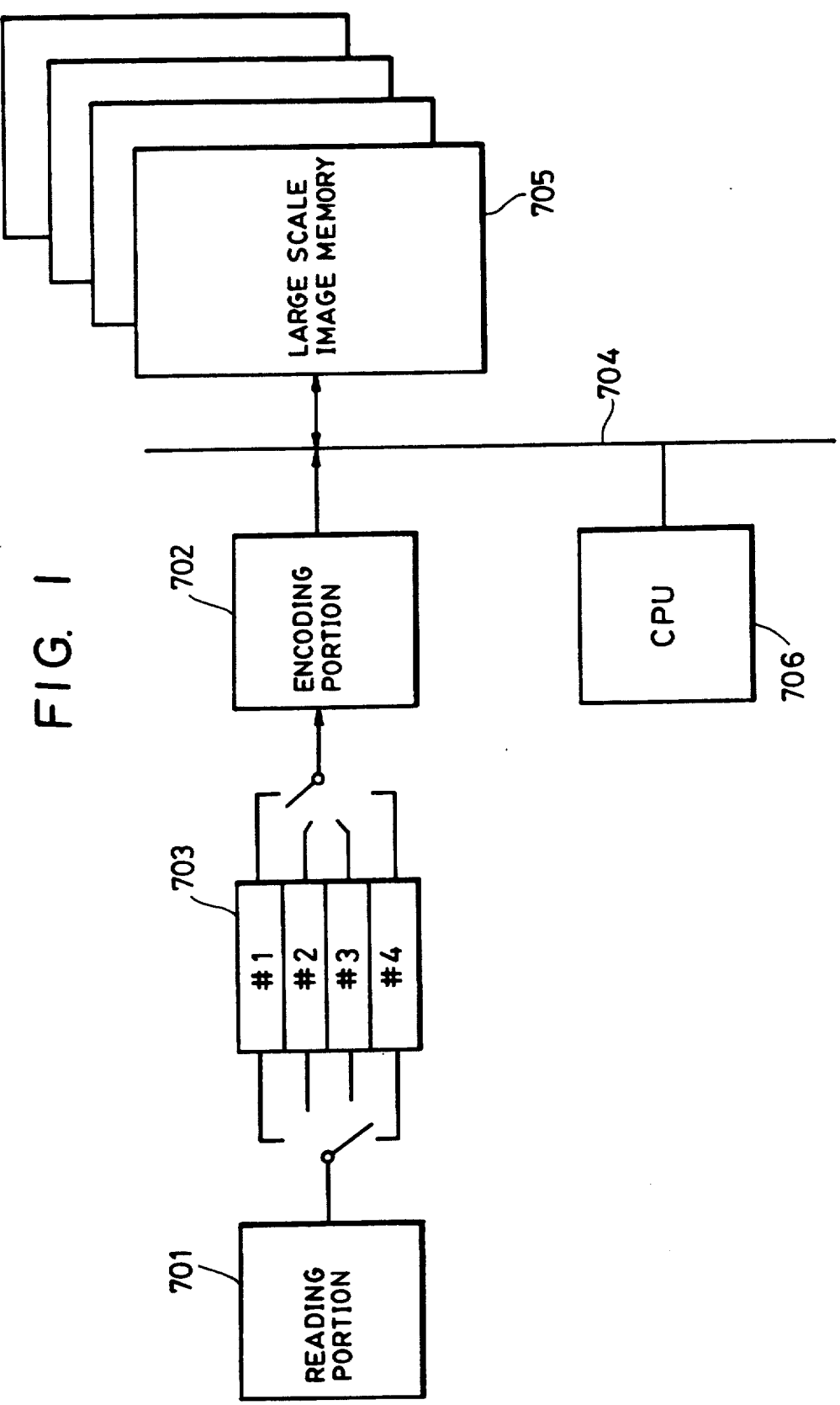
FIG. 1 is a block diagram of a conventional image data processing device.
Figure 2:
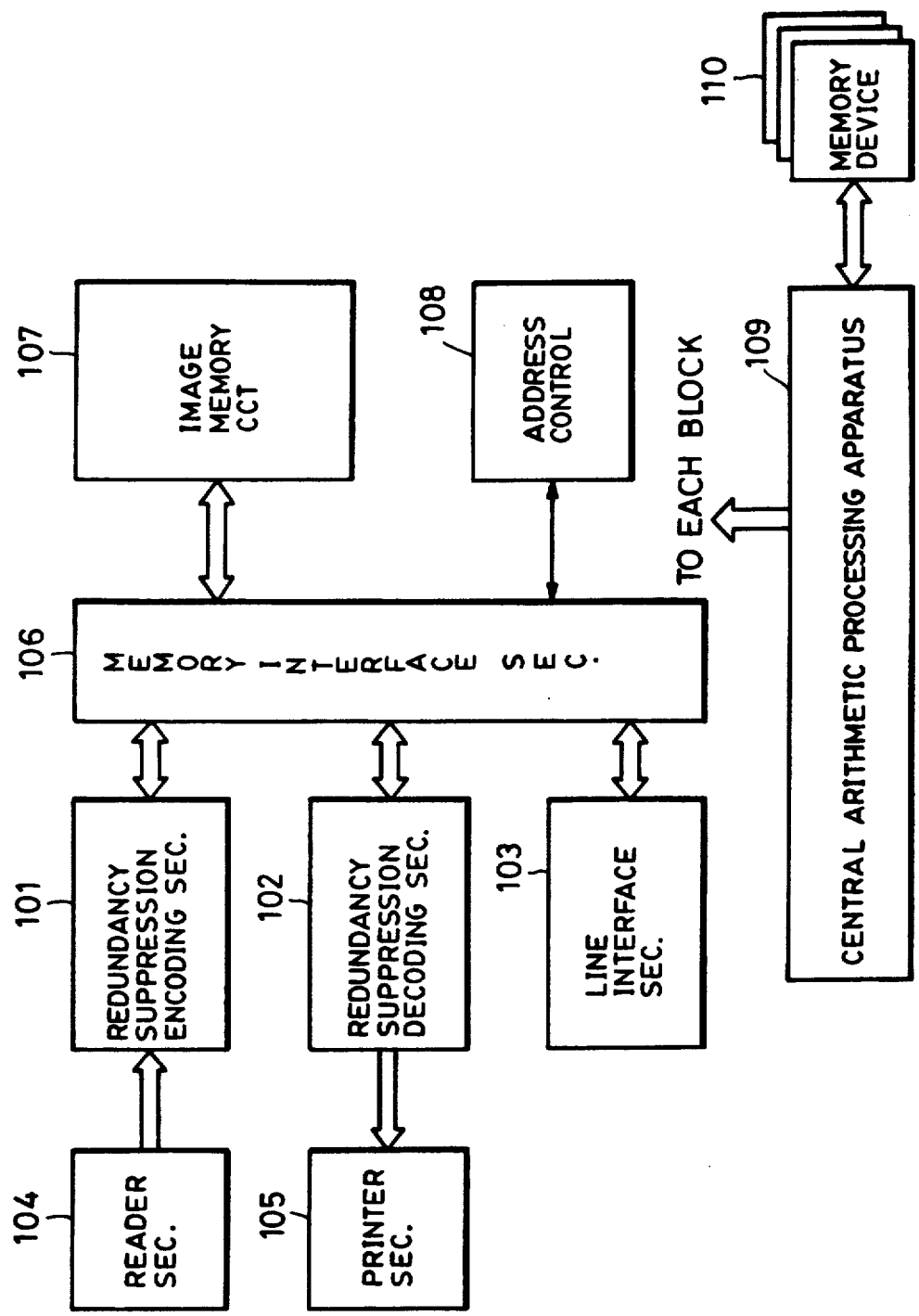
FIG. 2 is a block diagram of a facsimile apparatus to which the present invention is applied.

FIG. 2 is a block diagram of a facsimile apparatus to which the present invention is applied. The facsimile apparatus includes: a redundancy suppressing encoder 101 for encoding image data and a redundancy suppressing decoder 102 for decoding encoded image data; a line interface 103 for connecting a public line with the facsimile apparatus; a scanner 104 for reading an original image with an image sensor such as a CCD; a printer 105 for recording an image in accordance with image data provided to the printer; a memory interface 106; an address controller 108; a central processing unit 109 for controlling the individual blocks of the facsimile apparatus; a memory 110 for storing addresses, control information, etc.; and an image memory 107 for storing image information.

The image memory 107 is composed of, for example, a random access semiconductor memory. It stores image data obtained by encoding image data read from the scanner 104 in the redundancy suppressing encoder 101 or image data received from the line through the line interface 103, under the control of the address controller 108.

An embodiment of the present invention resides in a reading system for such a facsimile apparatus in which image data obtained by reading an original is encoded, and in which the encoded image data is DMA transferred through two DMA channels to, and is stored in, an image memory consisting of four banks.

Figure 3:
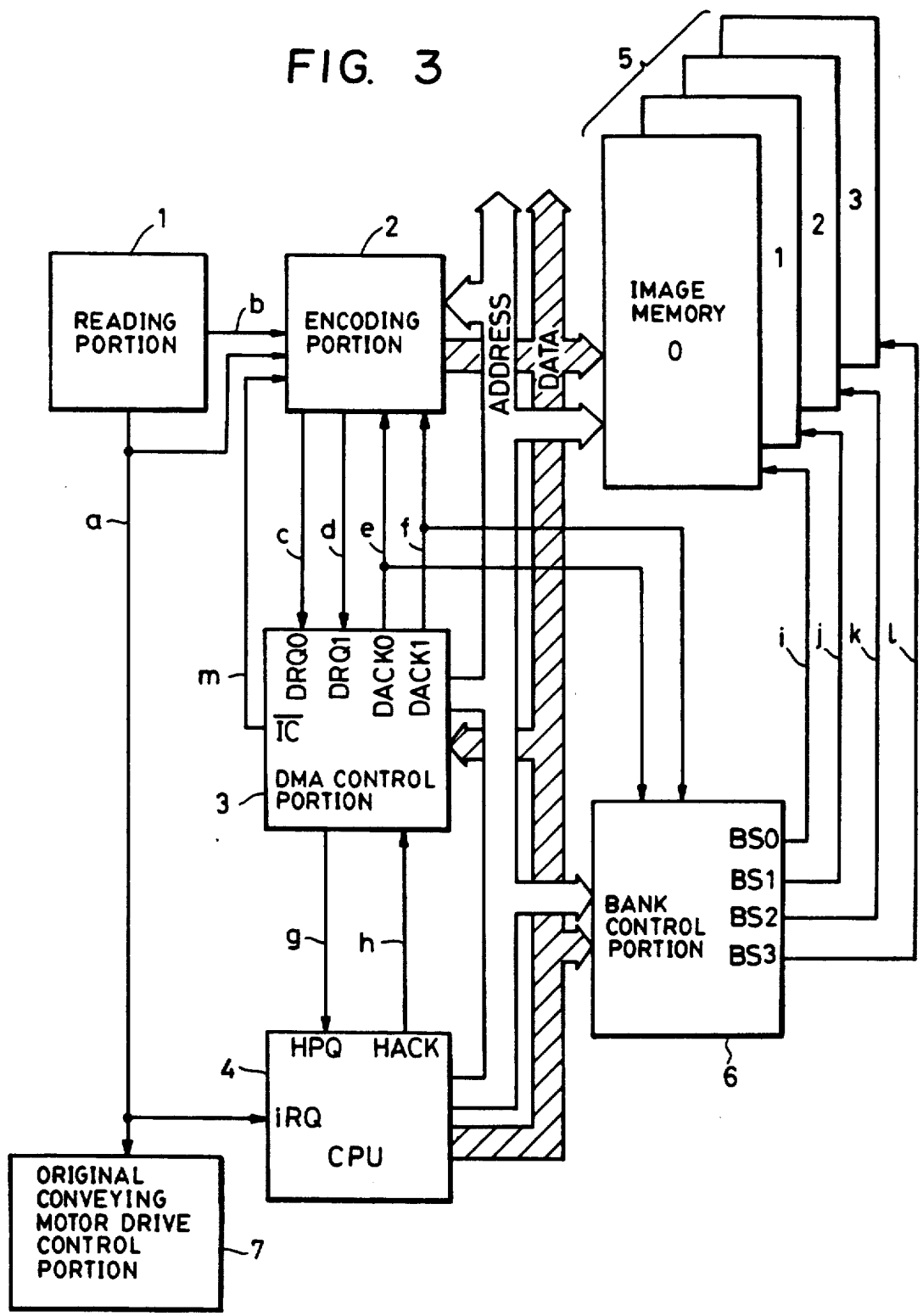
FIG. 3 is a block diagram of a data reading device of the apparatus of FIG. 2 which is related to the storage of image data, showing an embodiment of the present invention.

FIG. 3 is a block diagram of a portion of the facsimile apparatus shown in FIG. 2 which is related to the storage of image data into the image memory. The data reading system includes a reading portion 1 (which corresponds to the scanner 104 of FIG. 2) for reading an original scan line by scan line at a fixed timing by means of a light-receiving element such as a CCD, converting the data obtained into binary data and outputting it as serial data; an encoding portion 2 (which corresponds to the encoder 101 of FIG. 2) for encoding the binary data using the code system shown in Table 1 and DMA transferring the encoded data to an image memory; a DMA control portion 3 having, for example, two DMA channels, the DMA control portion outputting a DMA acknowledge signal (DACK signal) and a memory address for DMA transfer when it receives a DMA request (DRG) from an external circuit by using a transfer starting address and a number of transfer times which have been set in the DMA control portion beforehand; a central processing unit 4 (CPU) (which corresponds to the CPU 109 of FIG. 2) for controlling a system; a large scale image memory 5 (which corresponds to the image memory 107 of FIG. 2) consisting of, for example, four banks; a bank control portion 6 provided with two bank registers for the two DMA channels and one bank register used when the image memory 5 is accessed by the CPU 4, the bank controlling portion selecting one bank among the four banks of the image memory 5 on the basis of the contents of these registers; and a pulse motor control portion 7 which triggers by a line reading starting signal delivered from the reading portion 1 and conveys the original by a distance equivalent to one line.

The individual signals shown in FIG. 3 have the following functions.

A signal a represents a synchronizing pulse the reading portion 1 generates when it starts to read one line of the original, b; binary serial image data, c, d; DMA requesting signals (DRQ) by which the encoding portion 2 makes a request of DMA transfer to the DMA control portion 3 when the encoding portion 2 has prepared the encoded image data on one word that can be DMA transferred, c and d respectively corresponding to the individual DMA channels 0 and 1, e, f; DMA acknowledge signals (DACK) with which the DMA control portion respectively responds to the DRG signals, c and d, e and f respectively corresponding to the DMA channels 0 and 1, g, h; a signal (HRQ) by which the DMA control portion 3 requests the CPU 4 for the use of the system bus and a signal (HACK) by which the CPU 4 acknowledges it, i, j, k and l; bank select signals (BS0 to 3) that select one bank from the corresponding four banks of the image memory 5, the signals being obtained by decoding the contents of the corresponding bank registers when the access to the image memory 5 is to be obtained by the CPU 4 or the DMA transfer, and m; a service ending pulse (TC) that the DMA control portion 3 outputs when the DMA transfer has been executed a number of times that CPU 4 had set in the DMA control portion 3 previously.

A sequence of operations of this embodiment will be described below.

The image memory 5 is managed as a group of a plurality of units (hereinafter referred to as blocks) each of which has a series of addresses, and the image data corresponding to one page of the original is stored in the plurality of blocks. The image data stored in the blocks is called files. The CPU 4 memorizes block numbers and the order of these blocks as the management data on the files.

The memory 5 is used in units of a block because, since a plurality of files stored in the memory 5 are not erased from the image memory 5 in the order in which they received information for storage therein for reasons such as the time assigned transmittance employed in a facsimile, if the data is stored in the memory 5 without using the concept of division of the memory into blocks, the portion of the memory 5 which does not contain data is divided into a large number of areas which have different lengths.

Further, the size of one block should be set to a value larger than the value obtained by dividing the code length of the theoretically longest line by the number of DMA channels, so as to eliminate intervention of the CPU 4 which would be required to select another new block while the encoded data on a line is being DMA transferred.

First, the CPU 4 retrieves the two blocks (in which data is not stored) in the image memory 5 to be used, and sets the bank addresses, the block starting addresses and the lengths of the obtained two blocks in the bank registers provided in the bank control portion 6 for the DMA channels 0 and 1 and in a start address register and a count register in the DMA control portion 3 before the reading of an image is started.

Subsequently, the CPU 4 enables the DMA channels 0 and 1 simultaneously, and then activates the reading portion 1 and the encoding portion 2. In addition, the CPU 4 sets the number of picture elements that constitute one line of image data to be entered in the encoding portion 2.

The reading portion 1 generates a signal a that defines the period during which one line of image data is read at a fixed timing, and outputs it to the encoding portion 2, the CPU 4, and the motor driving portion 7 so that the operations of these components are synchronized.

After having output the signal a, the reading portion 1 outputs serial data b corresponding to one line to the encoding portion 2. After a predetermined reading time has elapsed, the reading portion 1 outputs another synchronizing signal a and then serial data corresponding to a subsequent line. Thereafter, the reading portion 1 repeats an operation cycle that consists of the above-described operations.

In response to the synchronizing signal a, the individual portions perform the following operations: The motor control portion 7 drives an original conveying motor so that an original is conveyed by a distance equivalent to one line within the period of the signal a.

Upon receipt of the signal a, the encoding portion 2 recognizes the start of a new line. Once encoding of the image data corresponding to the line has been ended, the encoding portion 2 assigns an ending code to the image data encoded, thereby completing encoding.

The CPU 4 receives the signal a as a signal indicating the request for an interrupt, and determines whether or not one of the DMA channels 0 and 1 which are in use has already transferred data in an amount equivalent to the length of the previously set block by referring to the status register provided in the DMA control portion 3. If it is determined that either of the DMA channels has ended transfer of data, the CPU 4 retrieves a new block (in which data is not stored) in which data is to be transferred, and sets values (which are the bank address, the start address and the length of that block) in the DMA control portion 3 and the bank control portion 6 so that that channel can be used again. Thus, once either of the DMA channels 0 and 1 has ended transfer of data, the setting of data on a subsequent DMA transfer is executed by the CPU 4 without waiting for the ending of the transfer by the other channel.

Thus, the system runs in such a manner that the operations of the individual portions are synchronized for each line.

Next, the operation relating to the encoded data will be described. Although the encoding portion 2 can employ both of the DMA channels 0 and 1, it uses the channel 0 first for DMA transfer. The image data b delivered to the encoding portion 2 from the reading portion 1 is encoded in the encoding portion 2. The encoding portion 2 outputs a DMA transfer request signal c (DRQ0) to the DMA control portion 3 when it has encoded one word of data. Upon receipt of that request, the DMA control portion 3 outputs to the CPU 4 a signal g (HRQ) indicating request for a right to the use of the system bus. Upon receipt of that signal g (HRQ), the CPU 4 outputs to the DMA control portion 3 a signal h (HACK) indicating the acknowledgment of the use of the bus. Once the DMA control portion 3 receives that signal h (HACK) from the CPU 4, it outputs a signal e (DACK0), urging the encoding portion 2 to output the encoded data to be DMA transferred on the bus. It also outputs a target memory address on an address bus. Also, the DMA control portion 3 outputs the signal e (DACK0) to the bank control portion 6 so that the bank control portion 6 sets one of the selecting signals i, j, k and l that assigns the target memory bank in an enabled state on the basis of the previously set contents of the bank register for DMA channel 0.

Thus, the encoded image data is DMA transferred on the assigned address in the assigned bank of the image memory 5 using the DMA channel 0.

Once the DMA transfer operations have been conducted a number of times previously set for each channel, the DMA control portion 3 outputs a pulse m to the encoded portion 2. Upon receipt of this pulse m, the encoded portion 2 switches the channel on which it outputs DMA requests to the DMA control portion 3. At the time the signal m is generated, preparation for the DMA transfer using the other channel has already been completed. In consequence, DMA transfer using the other channel can be executed instantaneously when the signal m is generated. For example, if the encoded portion 2 receives the signal m during the DMA transfer of a word of image data through the channel 0, words of data subsequent to that word of data are DMA transferred through the channel 1. This operation is recursively repeated each time a signal m is generated.

As stated above, the service states of the channels are referred to using signals c, d, e, f, g, h and m which are related to the DMA control portion 3 and the internal status register of the DMA control portion 3. Further, selection of a target bank register by the bank control portion 6 is made using signals e and f, and the DMA channel is switched over using the ending signal m.

Figure 4:
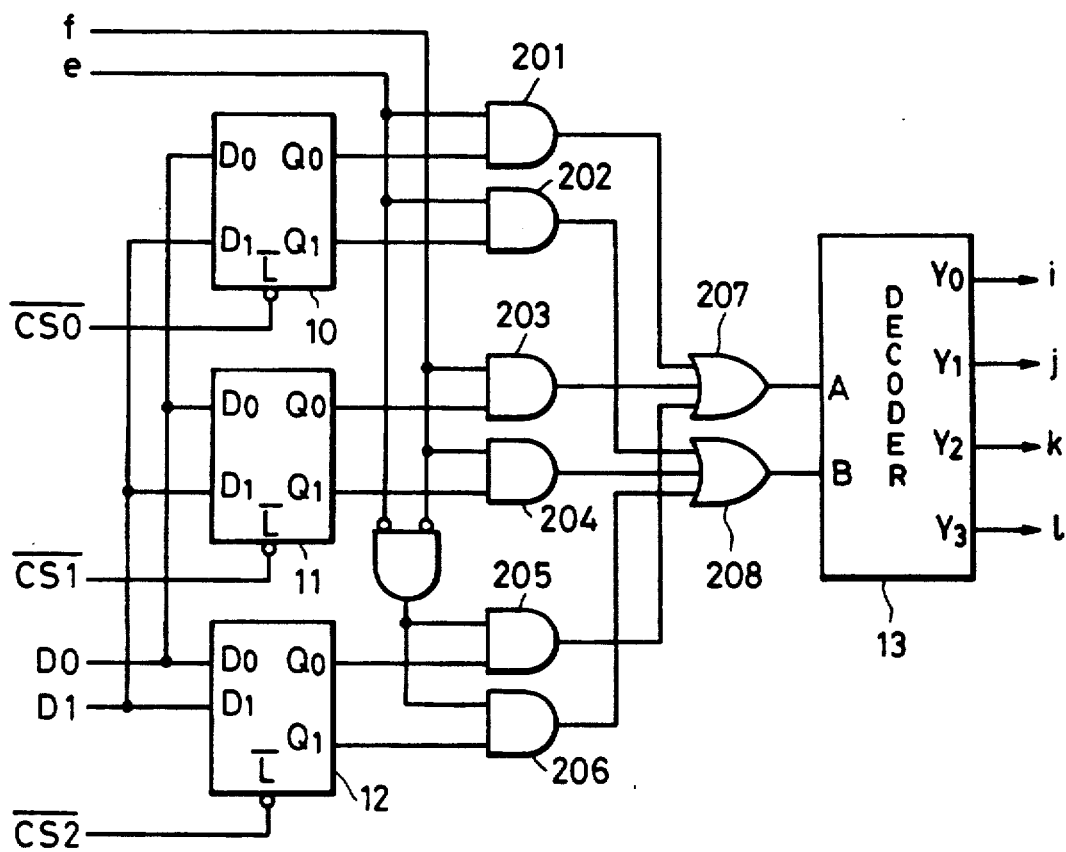
FIG. 4 is a block diagram of a bank control portion of for a memory.

FIG. 4 is a block diagram of the bank control portion 6. The bank control portion 6 includes AND gates 201 to 206, OR gates 207 and 208, A bank register 10 for the DMA channel 0, a bank register 11 for the DMA channel 1, a default bank register 12 selected when the CPU 4 obtains access to the memory while neither of the bank registers 10 and 11 is being selected, and a binary decoder 13 which receives A and B and outputs the decoded value to one of outputs Y0 to Y3. D0 and D1 represent data signals 0 and 1 on the system data bus of the CPU 4, and $\overline{CS0}$, $\overline{CS1}$ and $\overline{CS2}$ represent write select signals for the bank registers 10, 11 and 12, which are output by the CPU 4 in accordance with the system program.

When the transfer acknowledgment signal e (DACK0) for the DMA channel 0 assumes its "true" value after certain bank addresses have been written in the bank registers 10, 11 and 12 as the result of the aforementioned retrieval of the block to be used by the CPU 4, the output of the bank register 10 is selected by the AND gates 201 and 202, and the selected data is decoded by the binary decoder 13 and is generated as either of the bank select signals i to l that selects the corresponding bank. Similarly, when the signal f assumes its "true" value, the output of the bank register 11 is selected by the AND gates 203 and 204. In the case where neither of the signals e and f assumes its "true" value, the output of the bank register 12 is selected by the AND gates 205 and 206.

With the above-described arrangement, the CPU 4 or the other DMA channel can obtain access to any memory bank during the DMA operation that employs one of the DMA channels.

Figure 5:
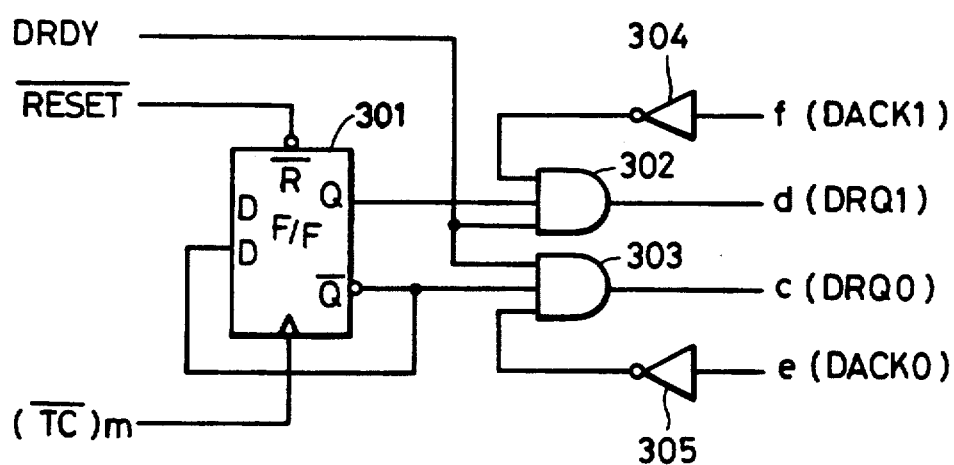
FIG. 5 is a block diagram of a DMA channel switching portion in an encoding portion.

FIG. 5 is a block diagram of a DMA channel selecting circuit which is used in the encoding portion 2. The DMA channel selecting circuit includes a D flip-flop 301, AND gates 302 and 303, and inverters 304 and 305. When reading is started, the $\overline{Q}$ terminal of the D flip-flop 301 is raised by application of a reset signal $\overline{RESET}$, making the DMA channel 0 selectable. Once the encoded data to be transferred has been prepared in the encoding portion 2, a DRDY signal rises, making the DRQ0 (signal c), which is output from the AND gate 303 to the DMA control portion 3, assume the "true" value. The DRDY signal falls when the DACK0 (signal e), which is the response to this DRQ0 from the DMA control portion 3, assumes its "true" value.

Once the ending signal m is input to the encoding portion 2 from the DMA control portion 3, the flip-flop 301 reverses, making the channel 1 selectable. In consequence, the channel 1 is selected at a subsequent DMA transfer.

Figure 6:
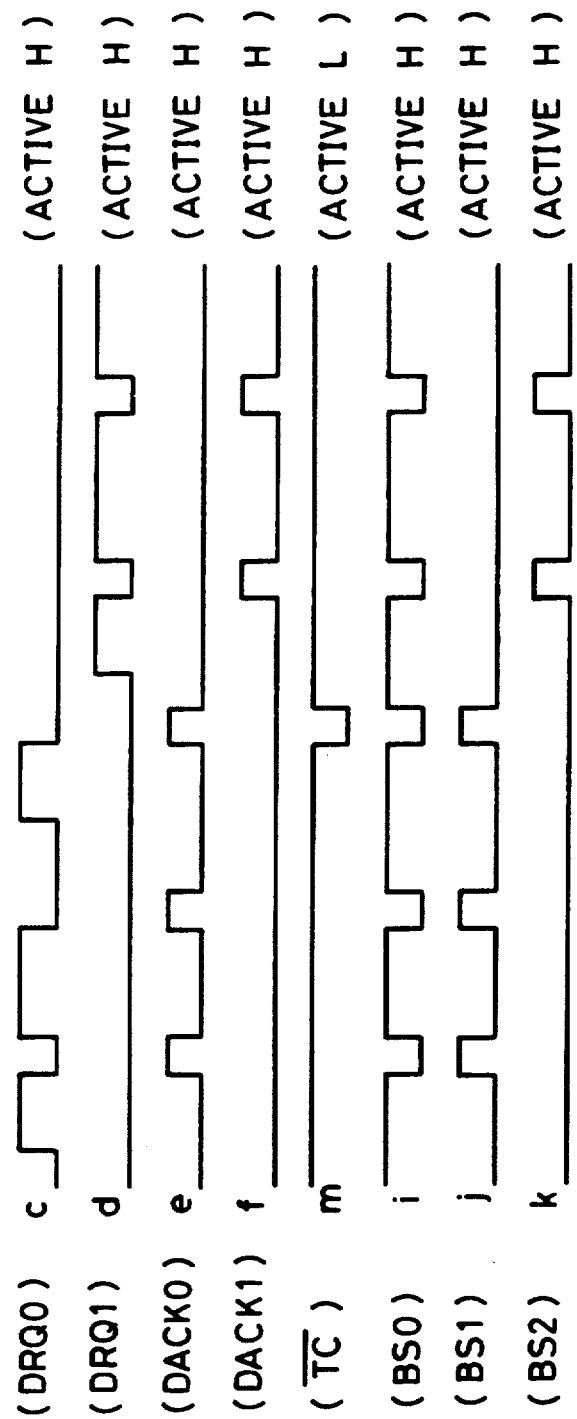
FIG. 6 is a timing chart of the DMA operation and the selection of a memory bank.

FIG. 6 is a timing chart of the operation shown in FIG. 5.

As can be seen in FIG. 6, the DMA channel is switched over from the channel 0 to the channel 1 when the ending signal m is input to the encoding portion 2.

In the operation shown in FIG. 6, it is assumed that the memory banks 1 and 2 are respectively selected when the channels 0 and 1 are used and that the memory bank 0 is selected in the default.

Table 1 lists a code table employed in this embodiment. A code contains a 2-bit flag field that represents the property of a code, and a 6-bit data field. The flag field is used to show what kind of data the data field is. For example, 01 represents pixel data, 00 represents a make-up run length, 10 represents a white terminating run length, and 11 represents a black terminating run length. Further, the flag field and the data field are also used to represent a line-ending code and a page-ending code, which are used as special codes. In this coding scheme, if the run length is less than 6, pixel data is represented by a 6-bit data field and a 2-bit flag field. If the run length is 6 or more, the data is represented by run length. This coding system has characteristics that the time required for encoding data is short and that the time interval at which the code is generated does not differ much from the speed at which pixel data is read from the reading element such as a CCD. In consequence, it enables the encoded data to be real-time DMA transferred in a general microcomputer system.

TABLE 1

| (1) Format | | | | | | | | |
|---|---|---|---|---|---|---|---|---|
| b7 b6 \|Flag\| | b5 | b4 | b3 Data | b2 | b1 | b0 | | |
| | | | (2) Code table | | | | | |
| | b7 | b6 | b5 | b4 | b3 | b2 | b1 | b0 | |
| Make-up | 0 | 0 | 0 | 0 | 0 | 0 | 0 | 0 | MC0 |
| run length | 0 | 0 | 0 | 0 | 0 | 0 | 0 | 1 | MC64 |
| : | 0 | 0 | 0 | 0 | 0 | 0 | 1 | 0 | MC128 |
| : | : | : | : | : | : | : | : | : | : |
| : | 0 | 0 | 1 | 1 | 1 | 1 | 1 | 1 | MC4032 |
| White | 1 | 0 | 0 | 0 | 0 | 0 | 0 | 0 | WTC0 |
| terminating | 1 | 0 | 0 | 0 | 0 | 0 | 0 | 1 | WTC1 |
| run length | 1 | 0 | 0 | 0 | 0 | 0 | 1 | 0 | WTC2 |
| : | : | : | : | : | : | : | : | : | : |
| : | 1 | 0 | 1 | 1 | 1 | 1 | 1 | 1 | WTC63 |
| Black | 1 | 1 | 0 | 0 | 0 | 0 | 0 | 0 | BTC0 |
| terminating | 1 | 1 | 0 | 0 | 0 | 0 | 0 | 1 | BTC1 |
| run length | 1 | 1 | 0 | 0 | 0 | 0 | 1 | 0 | BTC2 |
| : | : | : | : | : | : | : | : | : | : |
| : | 1 | 0 | 1 | 1 | 1 | 1 | 1 | 1 | BTC63 |
| Pixel data | 0 | 1 | 0 | 0 | 0 | 0 | 0 | 1 | |
| : | : | : | : | : | : | : | : | : | |
| : | 0 | 1 | 1 | 1 | 1 | 1 | 1 | 0 | |
| Line-ending | 0 | 1 | 0 | 0 | 0 | 0 | 0 | 0 | |
| Page-ending | 0 | 1 | 1 | 1 | 1 | 1 | 1 | 1 | |
| Order of bits | b5 | | b4 | b3 | | b2 | b1 | b0 | |
| of pixel data | Tn+5 | | Tn+4 | Tn+3 | | Tn+2 | Tn+1 | Tn | |

FIG. 7 is a timing chart, showing the flow of data in the embodiment shown in FIG. 3.

The encoded data representing the first and second lines is stored at the predetermined address in the memory bank 1 using the DMA channel 0. As in the previous case, it is assumed that the bank register is set so that the memory bank 0 is selected when the DMA is not executed.

A predetermined number of DMA transfers, which has been set for the DMA channel 0, ends during the transfer of encoded data representing the third line, so the DMA control portion outputs the ending pulse Tc (signal m). Thereafter, the data is DMA transferred to the address in the memory bank 2 which has already been assigned by the CPU 4 using the channel 1.

The CPU 4 is interrupted by the synchronizing pulse a that represents the starting of the fourth line, by which it recognizes that the service of the DMA channel 0 has ended. The CPU 4 thus allocates an empty block in the memory bank 3 to the DMA channel 0.

Following the transfer of encoded data representing the third line, the encoded data representing the fourth and fifth lines are also transferred through the DMA channel 1. During the transfer of the data representing the sixth line, the service of the DMA channel 1 ends, and the DMA channel is switched over to the DMA channel 0, as in the case of the transfer of the data representing the third line.

In the chart shown in FIG. 7, since the code length for one line varies due to the contents of the image, the amount of data on each line that is DMA transferred also changes.

Further, when the reading of the original is ended, the CPU 4 issues a command indicating that a subsequent line is the last line of a page to the encoding portion 2 while it is servicing the above-described interrupt. Upon receipt of this ending command, the encoding portion 2 outputs the special codes, including the line-ending code and the page-ending code shown in Table 1, when it has ended the encoding of image data representing the corresponding line, and transfers them to the image memory together with the encoded data, thereby completing encoding. Furthermore, the output of the page ending code is held in the encoding portion 2 as status information so that it is referred to by the CPU 4 when it recognizes that the storage of the encoded data on one page is ended.

Thereafter, if reading and storage of a subsequent original is necessary, the data representing the subsequent original is DMA transferred to a subsequent memory address. If there is no subsequent original, the CPU 4 detects which blocks have actually been used in the blocks that it set beforehand by referring to the DMA address register within the DMA control portion 3, and memorizes that the image file is constituted by these detected blocks.

The above-described embodiment employs the coding scheme shown in Table 1. However, other coding schemes may also be used in the present invention.

Furthermore, when printing is to be performed on the basis of the encoded data stored in the image memory, the encoded data is first DMA transferred to a decoding circuit, and the resultant decoded data is output to a printing portion such as a thermal head. If the DMA channel that transfers data at that time is provided with a bank register for its own use, the CPU 4 can obtain access to any bank in the image memory 5 during the printing. Further, the use of the bank register enables the reading operation of the above-described embodiment to be processed concurrently with the printing.

As stated above, in the present invention, since the encoded data is DMA. transferred using a plurality of channels, one DMA channel is ready for DMA operation at the time after the other DMA channel has transferred data a predetermined number of times. In consequence, the CPU 4 is capable of performing the reading operation only by servicing an interrupt each time one line is read. Further, since the speed at which each line is read is fixed and the continuous reading operation is enabled in this embodiment, even if the reading speed is increased, a continuous response frequency can be used to drive a motor, thereby reducing the cost of the motor. An expensive stepping motor driven by a self-started frequency would be required in the intermittent reading operation.

Further, since the memory bank used by the DMA for reading can be selected independently of the bank memories selected by the CPU and the other DMA, the CPU can obtain access to any bank in the image memory during the reading operation, thereby enabling the CPU to transmit or print the image data in the memory during the reading operation.

As will be understood from the foregoing description, in the present invention, a plurality of DMA channels are allocated to DMA transfer the encoded data, and these channels are switched over during the execution of DMA transfer. In consequence, the encoded data can be continuously DMA transferred, thereby enabling high-speed transfer.

Further, the speed at which an original is fed when the image data is read and stored in an image memory can be made fixed, and any bank in the image memory can be made accessible by the CPU during the reading and storage of image data independently of the DMA operation.

The above-described embodiment employs two DMA channels. However, the number of DMA channels used may be increased. This also applies to the number of memory banks.

The present invention can be applied not only to a facsimile apparatus but also to an image data transferring apparatus incorporated in an electronic image file or a digital copier.

The prevent invention has been described with reference to the preferred embodiment. However, it is to be understood that various modifications and alterations will occur without departing from the spirit of the scope of the invention as set forth in the appended claims.

What is claimed is:

1. An image data processing apparatus, comprising:
   entering means for entering image data;
   storage means for storing the image data which has been entered by said entering means; and
   transfer means, having a plurality of DMA channels each of which has a corresponding designation for designating a storage position in said storage means where image data is to be stored, said transfer means performing a DMA transfer of the image data entered by said entering means to said storage means using any one of the plurality of DMA channels,
   wherein said transfer means comprises selection means for selecting one of the plurality of DMA channels to be used for the DMA transfer, and
   wherein, whenever a predetermined number of the DMA transfers are terminated using one DMA channel according to the designation by the designation means corresponding to the one DMA channel, said selection means selects another DMA channel for the next DMA transfer which is to be performed according to the designation by the designation means corresponding to the another DMA channel, and
   wherein while the DMA transfer is performed using one DMA channel, the storage position of the image data required for the next DMA transfer using the another DMA channel is set in the designation means corresponding to the another DMA channel.

2. An apparatus according to claim 1, wherein said transfer means performs the DMA transfer of the image data each time a predetermined amount of the image data to be transferred has been entered.

3. An apparatus according to claim 1, wherein said entering means includes reading means for reading an image of an original and generating the image data representing the image, and an encoding means for encoding the image data generated by said reading means.

4. An apparatus according to claim 1, wherein said storage means has a plurality of memory banks that respectively store the image data, and wherein said transfer means selects one of the memory banks in which the image data is stored concurrently with the selection of the DMA channel.

5. An image data processing apparatus, comprising:
   entering means for entering image data;
   storage means for storing the image data which has been entered by said entering means; and
   transfer means, having a plurality of DMA channels each of which has a corresponding designation means for designating a storage position in said storage means where the image data is to be stored, said transfer means performing a DMA transfer of the image data entered by said entering means to said storage means using any one of the plurality of DMA channels,
   wherein said transfer means comprises selection means for sequentially selecting one of the plurality of DMA channels to be used for the DMA transfer, the selected DAM channel transferring the image data according to the designation of the designation means corresponding to the selected DMA channel, and
   wherein, while the DMA transfer is performed using one DMA channel, the storage position of the image data required for the next DMA transfer using another DMA channel is set in the designation means corresponding to the another DMA channel.

6. An apparatus according to claim 5, wherein said transfer means performs the DMA transfer of the image data each time a predetermined amount of the image data to be transferred has been entered.

7. An apparatus according to claim 5, wherein said entering means includes reading means for reading an image of an original and generating the image data representing the image, and an encoding means for encoding the image data generated by said reading means.

8. An apparatus according to claim 5, wherein whenever a predetermined number of the DMA transfers are performed using one DMA channel, said selection means selects another DMA channel for the next DMA transfer.

9. An apparatus according to claim 5, wherein said storage means has a plurality of memory banks that respectively store the image data, the plurality of memory banks respectively corresponding to the DMA channels.

10. An image data processing apparatus, comprising:
    entering means for entering image data;
    storage means for storing the image data which has been entered by said entering means; and
    transfer means having a plurality of DMA channels each of which has a corresponding designation means for designating a storage position in said storage means where the image data is to be stored, said transfer means performing a DMA transfer of the image data entered by said entering means to said storage means using any one of the plurality of DMA channels,
    wherein said transfer means comprises selection means for selecting one of the plurality of DMA channels to be used for the DMA transfer, and
    wherein, whenever the DMA transfer of a predetermined amount of the image data is terminated using one DMA channel according to the designation by the designating means corresponding to the one DMA channel, said selection means selects another DMA channel for the next DMA transfer which is to be performed according to the designation by the designation means corresponding to the another DMA channel.

11. An apparatus according to claim 10, wherein said transfer means performs the DMA transfer of the encoded image data each time a predetermined amount of the encoded image data to be transferred has been entered.

12. An apparatus according to claim 10, wherein while the DMA transfer is performed using the one DMA channel, the designation means corresponding to the another DMA channel sets the storage position of the image data required for the next DMA transfer using the another DMA channel.

13. An apparatus according to claim 10, wherein said storage means has a plurality of memory banks that respectively store the encoded image data, and wherein said transfer means selects one of the memory banks in which the encoded image data is stored concurrently with the selection of the DMA channel.

* * * * *

UNITED STATES PATENT AND TRADEMARK OFFICE
CERTIFICATE OF CORRECTION

PATENT NO.  : 5,193,169
DATED       : March 9, 1993
INVENTOR(S) : YUJI ISHIKAWA

It is certified that error appears in the above-identified patent and that said Letters Patent is hereby corrected as shown below:

<u>COLUMN 6</u>

Line 24, "ccrresponding" should read --corresponding--.
   Line 43, "AN( gate 303" should read --AND gate 303--.

<u>COLUMN 8</u>

Line 47, "DMA." should read --DMA--.

<u>COLUMN 10</u>

Line 22, "DAM" should read --DMA--.

Signed and Sealed this

Eighteenth Day of January, 1994

*Attest:*

BRUCE LEHMAN

*Attesting Officer*     *Commissioner of Patents and Trademarks*